United States Patent Office 2,914,629
Patented Nov. 24, 1959

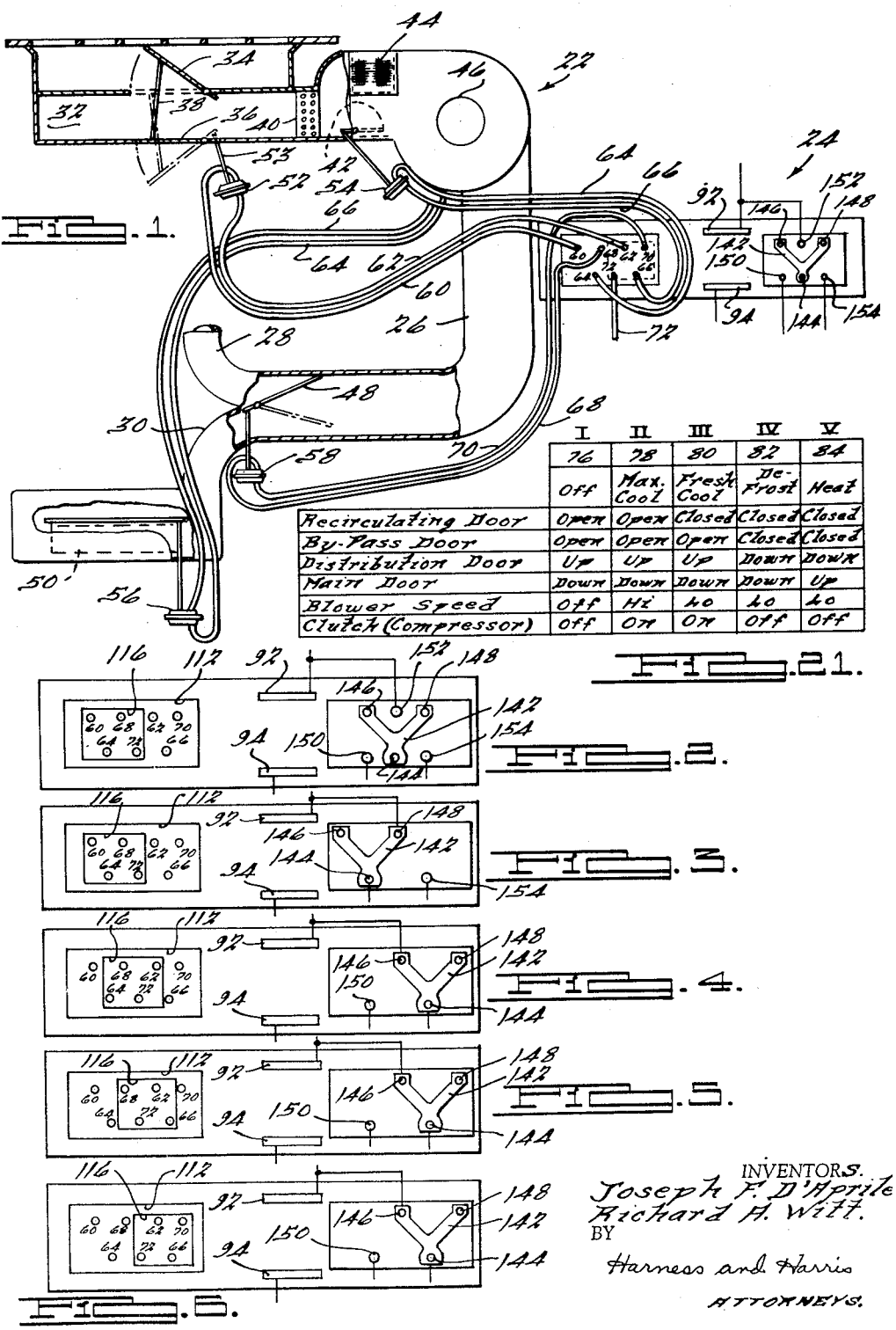

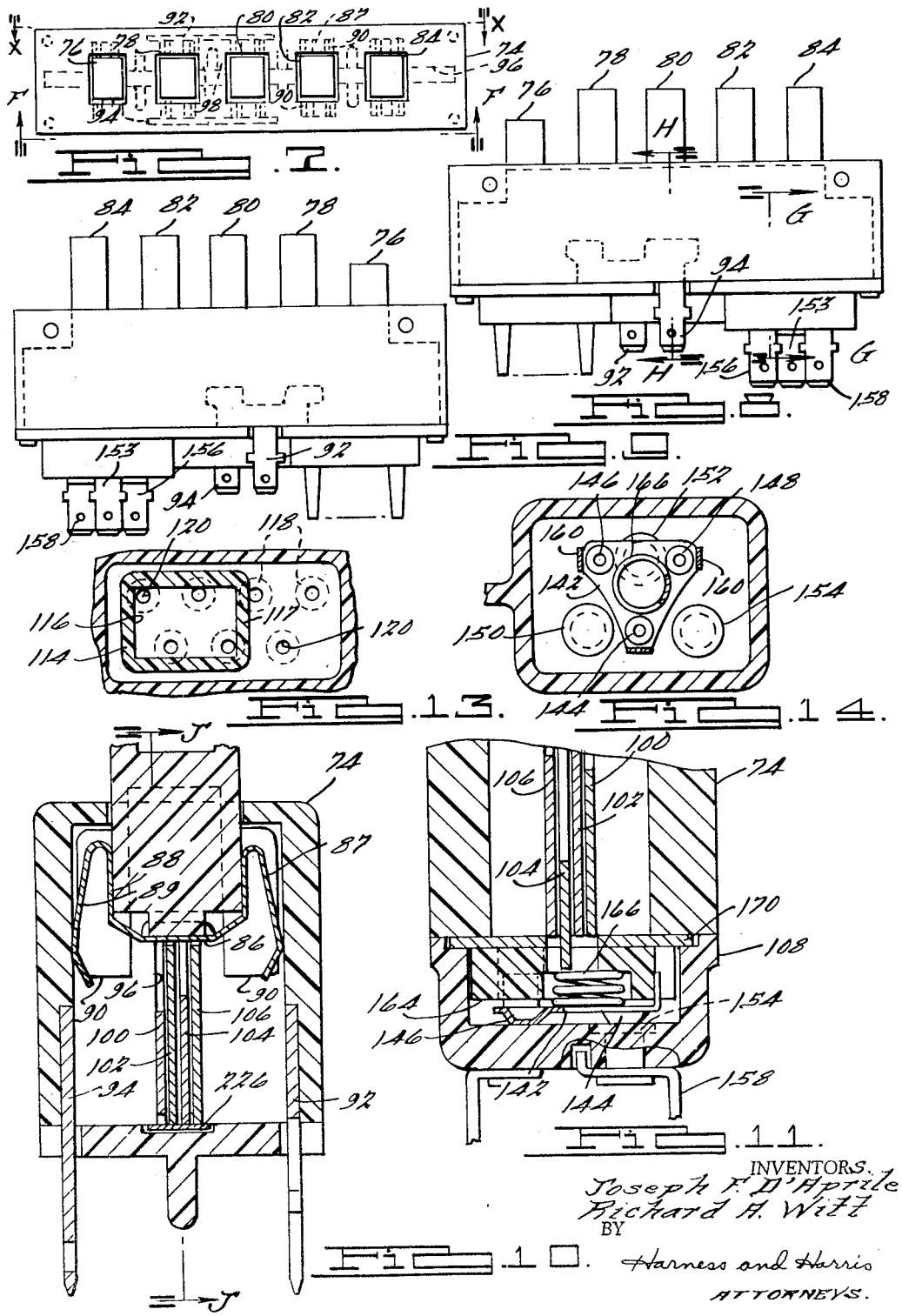

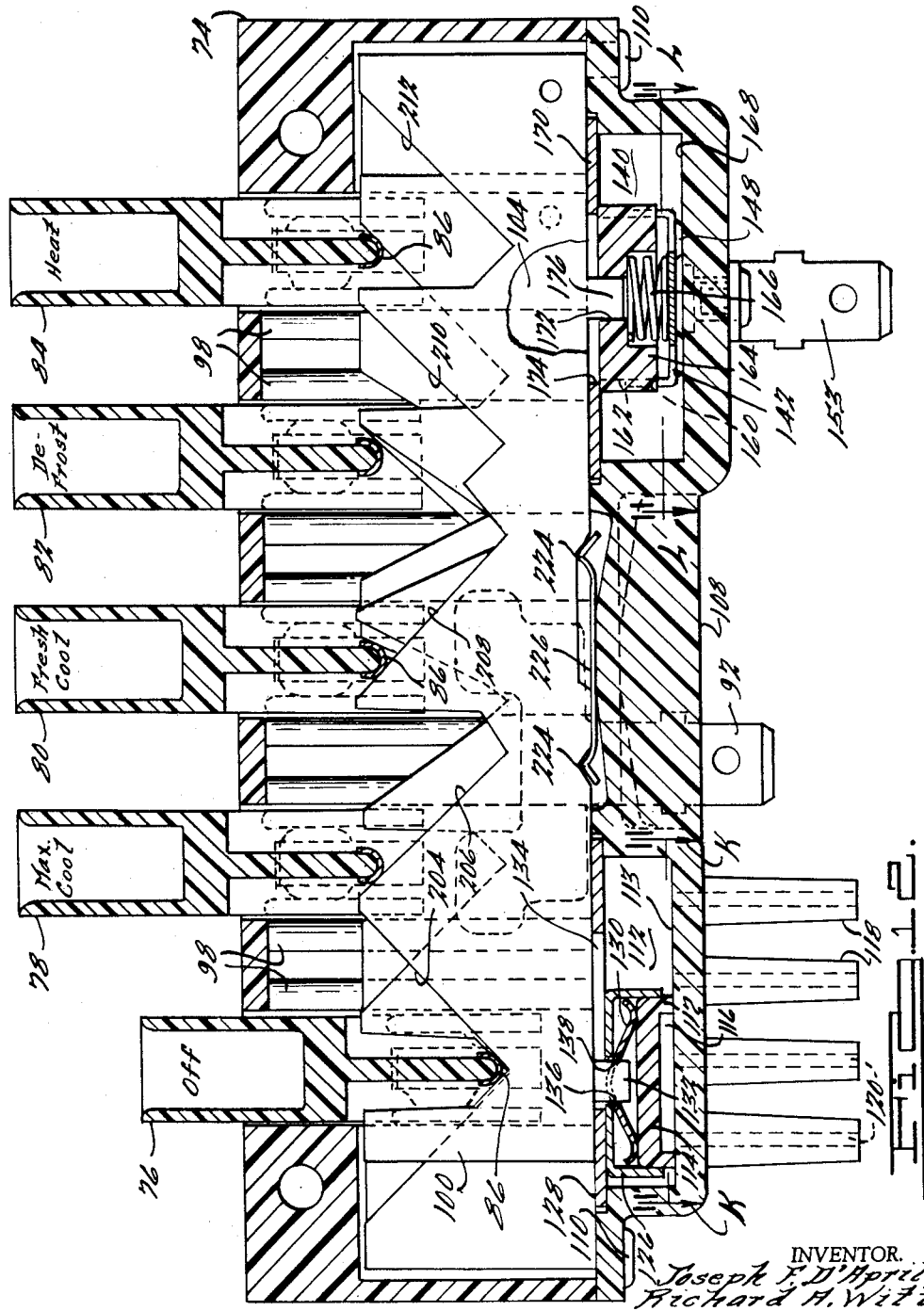

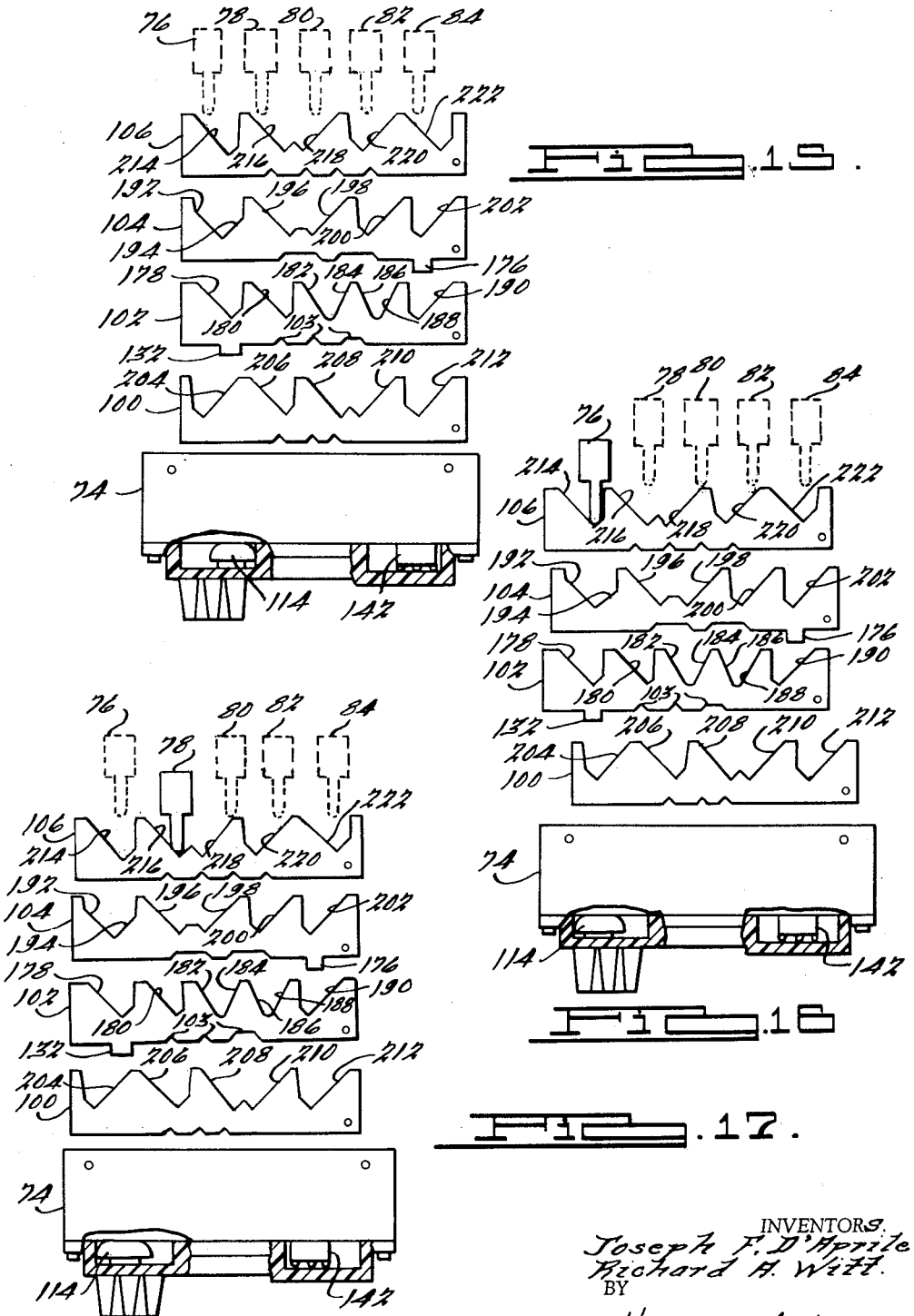

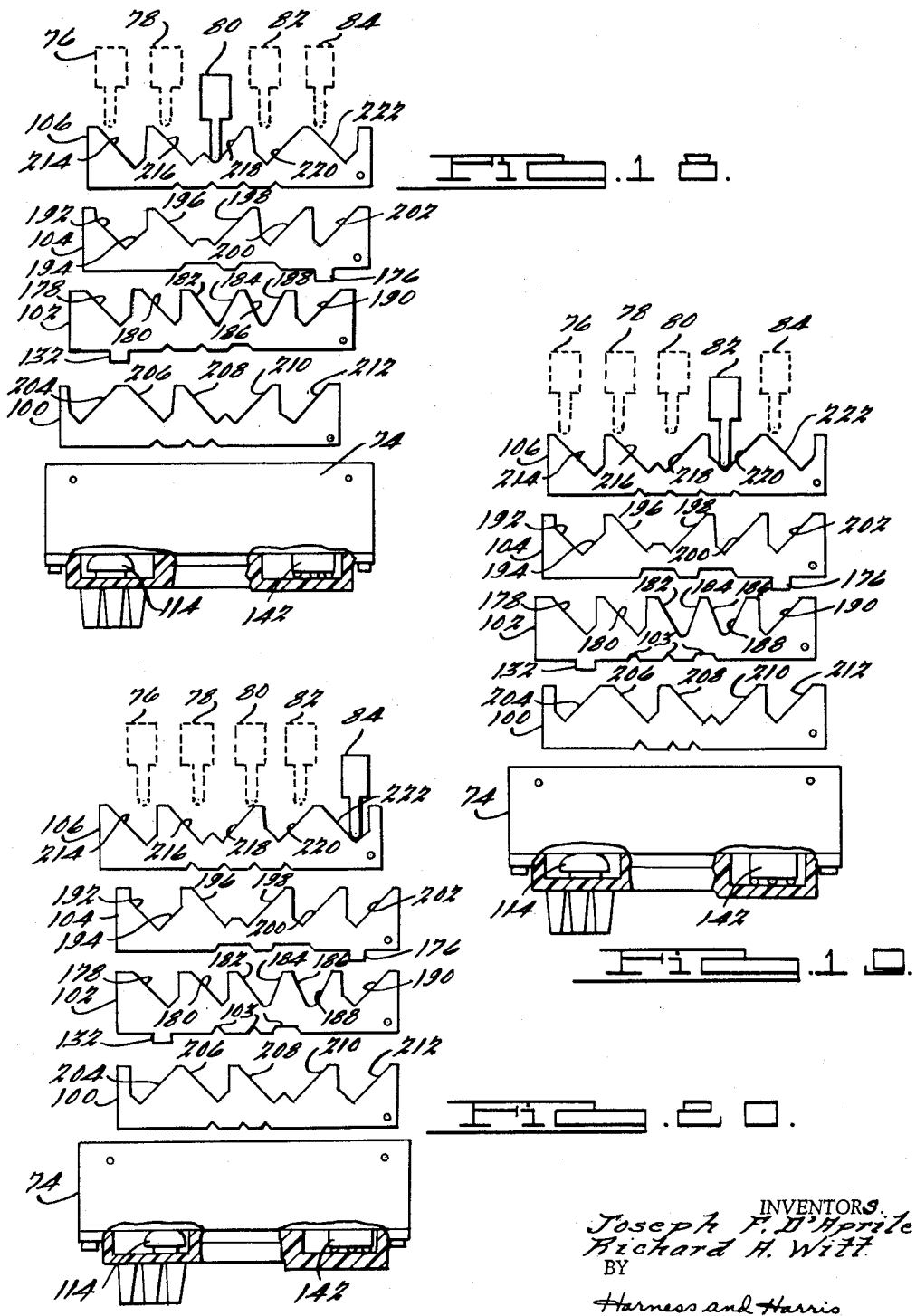

2,914,629

CONTROL DEVICE

Joseph F. D'Aprile and Richard A. Witt, Detroit, Mich., assignors to Chrysler Corporation, Highland Park, Mich., a corporation of Delaware Application April 23, 1958, Serial No. 730,370

18 Claims. (Cl. 200—61.86)

This invention relates to a control device utilizing a plurality of actuators such as push buttons for selectively positioning a valve and/or an electrical contractor at a plurality of stations.

A control device of the type to be described herein has been found to be particularly useful in connection with automobile air conditioning and heating apparatus in that it provides an operator with a plurality of actuators, such as push buttons, which he may selectively actuate to establish in the air conditioning and heating apparatus a plurality of operating conditions. The control device is capable of utilizing selective actuator movements to position a valve and/or electrical contactor at different progressively arranged stations. Thus when the valve is associated with a source of fluid pressure and/or fluid operated motors, and the contactor is associated with electrical appliances such as blowers, each valve and contactor station may be utilized to establish a different operating condition in the air conditioning and heating apparatus.

Heretofore push button controlled devices have been utilized for operating switches such as those found, for example, on electric stoves, and while they have, like the device herein described, used slides for operating switches they have, as far as is known, used a single operating slide for each contactor with only an "off" and "on" station for that slide.

Since a separate slide is required in these prior devices for each actuating station of the electrical contactor, a large number of slides is required to control all of the operating conditions of a modern air conditioning and heating unit, particularly of the type used in automobiles, when using one of these prior devices as a control for said unit.

It is an object of this invention to provide a control device of the aforesaid type adapted for installation as aforesaid but which will overcome the aforesaid objections.

Another object is to provide a control device of simple construction and of very low cost in relation to conventional devices of this general type which, when installed in an air conditioning and heating system, will operate efficiently to control the components of said system.

Another object is to provide a control device of small dimensions in relation to conventional devices of this general type which is capable of controlling a relatively large number of components of an air conditioning system.

Another object is to provide means for positioning a slide and its associated valve and/or switch at any one of a number of sequentially arranged stations.

In carrying out this invention, a fluid pressure master slide and an electrical master slide are provided. These slides carry a fluid pressure valve and an electrical contactor respectively and are movable to a number of different positions to connect at each position different fluid pressure actuated components and electrically actuated components of an air conditioning system with a fluid pressure source and an electrical current source respectively. These slides are provided with a plurality of ramps or cam surfaces which are so spaced and so angularly inclined with respect to each other that the successive engagement of said surfaces with push buttons or actuators will cause said slides to move in increments to successively position said slides at said number of different positions.

Further objects and advantages of this invention will be apparent from the following detailed illustration thereof, reference being had to the accompanying drawings, in which:

Figure 1 is a schematic view partly in cross section of an automobile air conditioning and heating system and the control device therefore;

Figures 2 through 6 are schematic representations of the control device and its associated valve and contactor at each operating position;

Figure 7 is a top elevation view of the control device;

Figure 8 is a view along F—F of Figure 7 in the direction of the arrows;

Figure 9 is a view along F—F of Figure 7 in a direction opposite to the arrows;

Figure 10 is a transverse cross-sectional view taken on the lines H—H of Figure 8;

Figure 11 is a transverse cross-sectional view taken on the lines G—G of Figure 8;

Figure 12 is a cross-sectional side view of the control device taken along the lines J—J of Figure 10 and showing the four slides in their superimposed positions;

Figure 13 is a cross-sectional view taken on the lines K—K of Figure 12 in the direction of the arrows;

Figure 14 is a cross-sectional view taken on the lines L—L of Figure 12 in the direction of the arrows;

Figures 15 through 20 are diagrammatic views showing the relative positions taken by the components of the control device as the push buttons are successively depressed from left to right; and Figure 21 is an operating chart showing the operation of the system components upon the depression of each actuator.

Referring in detail to the drawings, and in particular to Figure 1, a combined automotive air conditioning and heating system designated generally as 22 is operatively connected to a control device therefor designated generally as 24. System 22 consists of a main air conduit 26 having branch portions 28 and 30 at one end and an air chamber 32 at the other end. Air chamber 32 is opened to atmospheric fresh air through fresh air door 34 and to recirculating air within the automobile through recirculating door 36. Doors 34 and 36 are pivotally connected by a tie rod 38 which closes either door as the other is opened. By such an arrangement, for example, fresh air is allowed to flow into chamber 32 when fresh air door 34 is open but is not allowed to flow directly into the automobile since recirculating door 36 is closed. Progressing clockwise through the system, an air conditioning evaporator 40 is located in conduit 26 and is operatively connected to a suitable air conditioning gas compressor suitably mounted on the automobile. The compressor is operatively connected to the engine by a magnetically operated clutch the energization of which is advantageously controlled by the control device 24 in a manner to be described in detail below. A bypass door 42, when open, allows air which has passed through the evaporator 40 to flow through the system without being heated by heater core 44. When door 42 is closed, the air must pass through heater core 44. A two speed blower 46 positioned in conduit 26 provides a means for accelerating the air flow throughout the system under certain operating conditions and is advantageously controlled by the control device 24 in a manner also to be described below. A main door 48 pivotally mounted in conduit 26 provides a means to direct the flow of air according to the operating conditions desired to either branch 28 or 30. A distribution door 50 located in branch 30 provides a means to direct the flow of air within the automobile.

The above mentioned recirculating, bypass, distribution and main doors are opened and closed by fluid actuated power devices of the double acting diaphragm type 52, 54, 56, and 58 respectively. These power devices are operatively connected to the control device 24 through fluid conduits (60, 62), (64, 66), (64, 66), and (68, 70) respectively. The manner in which the transmission of fluid pressure through these conduits to their respective cylinders is controlled by the valve 114 is as follows.

Taking power device 52, for example, and referring to Figure 1, the position of the recess 116 of valve 114 is such that the conduit 62 is operatively connected to the low pressure of the manifold while the other conduit 60 of device 52 is open to the chamber 112 which is at atmospheric pressure. This pressure differential across the diaphragm of device 52 causes the diaphragm and attached rod 52 to move downward in Figure 1 and pivot door 36 to its closed position.

Referring next to Figures 7 through 12, the control device will be described in detail. The top elevational view of Figure 7 of the control device shows a housing 74 having five apertures through the top thereof through which apertures slidably extend five push buttons or actuators 76, 78, 80, 82, and 84. Referring to Figure 10, these actuators are made of an electrically insulative material and are provided with a spring member 88 positioned between the segments 90 on the end of each actuator. Portions of each said spring member provide a cam surface 86 and a pair of resilient arms 87 and 89 which arms are resiliently urged into contact with the inside of housing 74 to give stability to the sliding motion of the actuators and to make electrical contact when desired with electrical terminals 92 and 94 respectively which terminals are operatively connected to the leads of the magnetic clutch mentioned above. In the present system the magnetic clutch is operative to connect the air conditioning compressor to the engine only when the "Maximum Cool" and "Fresh Cool" (see Figure 21) conditions are desired and, therefore, the contacts 92 and 94 are only large enough to make contact with depressed actuators 78 and 80, see Figures 7, 8, and 9.

Referring to Figures 7 and 10, a recess 96 defined by the projections 98 extending from the inside of housing 74 to between the actuators, slidably receives four slides 100, 102, 104, and 106. These slides are shown in detail in Figures 15 through 20, and their relative motions with respect to each other as each actuator is depressed will be described below.

Referring to Figures 12 and 13, housing 74 is provided with an enclosure plate 108 secured to the underside thereof by suitable screw means 110. A chamber 112 in said plate slidably receives a valve member 114 having a recess 116 in the underside thereof. The border 117 of recess 116 and the inner surface 113 of chamber 112 are both flat and when fitted together produce a substantially air tight seal. Surrounding the top of valve member 114 is a valve carrier 126 retained in position by a valve retaining insert 128. A spring 130 resiliently urges valve member 114 toward surface 113 of chamber 112. A projection 132 on the slide 102 extends through a slot 134 in insert 128 and through suitable apertures 136 and 138 in said spring 130 and said valve carrier 126 respectively. The slot 134 in insert 128 is sufficiently long to permit the projection 132 to move far enough to the left and right to position the valve member 114 in all of its operating positions as represented by the dotted enclosure in Figures 2 through 6.

Seven projections 118 extend downwardly from plate 108 and open into chamber 112 through apertures 120 provided in each of said projections. These projections provide a means for operatively attaching the cylinder conduits and the fluid pressure source conduit to the chamber 112. The arrangement of said conduits on said projections is shown in Figures 2 through 6, wherein (1) 72 represents the orifice of the fluid pressure source conduit 72 which connects recess 116 in valve member 114 with the low pressure portion of the engine manifold, (2) 64 and 66 represent the orifices of the conduits 64 and 66 operatively connecting said recess 116 to cylinders 54 and 56, (3) 60 and 62 represent the orifices of the conduits 60 and 62 operatively connecting said recess 116 to cylinder 52, and (4) 68 and 70 represent the orifices of the conduits 68 and 70 operatively connecting said recess 116 to cylinder 58. It is noted that the conduits and their orifices are given the same character numeral to avoid undue complexity in the subsequent description of operation of the control device.

Referring to Figures 12 and 14, a chamber 140 in plate 108 slidably receives an electrical contactor 142 having three spaced projections 144, 146, and 148 thereon. Secured to the plate 108 and extending therethrough into chamber 140 are three electrical rivet type contacts 150, 152, and 154. In the present system contact 150 is connected through terminal 156 to the high speed lead of blower 46, contact 154 is connected through terminal 158 to the low speed lead of blower 46, and contact 152 is connected to an electrical power source through terminal 153. Contactor 142 has several upstanding prongs 160 spaced around the periphery thereof which slidably fit into slots 162 spaced around the periphery of a contactor carrier 164. A spring 166 urges contactor 142 against surface 168 of chamber 140. A contactor retaining insert 170 holds the contactor assembly within chamber 140. Aperture 172 in carrier 164 and slot 174 in insert 170 receive projection 176 of slide 104. Slot 174 is sufficiently long to allow slide 104 to move contactor 142 far enough to the right and left (refer to Figures 12 and 14) to position said contactor in all three of its operating positions with respect to contacts 150, 152, and 154.

In describing the four slides it is noted that two of the slides 100 and 106 are not operatively connected to either the valve member 114 or the contactor 142 and are used only to return depressed actuators to their "up" positions. Referring to Figure 15, slide 102 which is adapted to be operatively connected to valve member 114 through projection 132 on said slide has ramps 178, 180, 182, 184, 186, 188, and 190 thereon upon each of which a selected one of the actuators may ride. It is noted that the angles of inclination of said ramps differ from each other and that said ramps are unevenly spaced apart. It is further noted, however, that if the ramps were spaced evenly and had the same angles of inclination, the actuators would have to be unevenly spaced to produce the desired incremental motion of the slide. It is readily seen that as the cam surface 86 of actuator 76, for example, is pushed into contact with ramp 178 of slide 102, the horizontal force component transmitted to the slide will move it to the left as shown in Figure 16. This movement of the slide causes the attached valve member 114 to also move from the right to the left of chamber 112 as sequentially shown in Figures 15 and 16. The ramps on each of the slides are numbered in Figure 15 so that a detailed movement of each slide can be described as the actuators are depressed from left to right as shown in Figures 15 through 20. Referring again to Figure 15 and to slide 102, notches generally designated as 103 are provided on the lower edge of said slide and are adapted to be engaged by the projections 224 on either end of spring 226 secured to plate 108. The purpose of this spring is to provide a resistance to movement of the slides longitudinally of the housing once the slides are moved to one of their operating positions. Notches 222 are so spaced on said slide as to correspond to the different operating positions of said slide. Slides 100, 104, and 106 are provided with equivalent notches which correspond in position on said slides to the operating positions of said slides.

The operation of the control device and the associated air conditioning and heating system will be described in conjunction with the operating chart shown in Figure 21. In the chart, the number of the actuator is written directly above the operating condition imposed upon the system by the depression of that particular actuator. As shown in Figure 15, all of the actuators are in their "up" positions and all of the slides are in an extreme right hand position. The situation depicted by Figure 15 never actually exists during the normal operation of the control device, but serves as a starting point from which the successive depression of the actuators from left to right can be described.

Referring to Figures 2 through 5, 15, and 16, as actuator 76 is depressed its cam surface 86 rides upon the ramps 214, 192, and 178 of slides 106, 105, and 102 respectively and causes these slides to move to the left and assume the positions shown in Figure 16. It is noted that slide 102 which is operatively connected to valve member 114 moves said valve member to its far left position at which position it encompasses within its recess 116 the orifices 60, 64, 68, and 72 of conduits 60, 64, 68, and 72 respectively. Since orifice 72 communicates with a source of relatively constant low pressure, the pressure within chamber 112 drops. This pressure drop is communicated through orifice 64 to one side of each of the diaphragms of the fluid cylinders 54 and 56, through orifice 60 to one side of the diaphragm of fluid cylinder 52, and through orifice 68 to one side of the diaphragm of fluid cylinder 58. In response to these pressure drops the cylinders 54, 56, 52, and 58 will respectively react to (1) move the bypass door 42 to its "open" position, (2) move the distribution door 50 to its "up" position, (3) move the recirculating door 36 to its "open" position, and (4) move the main door 48 to its "down" position. These positions of the doors are shown in the first vertical column of the chart of Figure 21. Simultaneously with the movement of valve member 114 in response to the movement of its associated slide 102, the contactor 142 moves in response to the movement of its associated slide 102, the contactor 142 moves in response to the movement of its associated slide 104 to the position with respect to the contacts 150, 152, and 154 shown in Figures 2 and 14. It is noted that in this position none of the three projections on the contactor is in electrical contact with any of the three contacts on surface 168 of chamber 140, and the blower 46 is turned "off" as shown by column 1 of the chart. It is also noted that the spring 88 on actuator 76 does not make electrical contact with terminals 92 and 94 and the magnetic clutch of the compressor is turned "off," also in accordance with column 1 of said chart. The movement of slides 100 and 106 in the above exemplary operation does not perform any function, however, in all subsequent operations of the device these slides will act to return each depressed actuator to its "up" position as each subsequent actuator is depressed.

Further describing the operation of the device, as actuator 78 is depressed, ramps 196 and 206 of slides 104 and 100 respectively will be engaged by cam surface 86 of actuator 78 and said slides will be moved to the farthest left operating position of the device as shown in Figure 17. Slides 102 and 106 and valve member 114 connected to slide 102 will not be moved in this instance by actuator 78 since they have already been moved to their farthest left position by the actuator 76. As slide 104 moved to the left, contactor 142 connected thereto moves to its farthest left operating position as shown in Figure 3 and electrically connects the electrical power source contact 152 to the high speed contact 150 of the blower 46 in accordance with column two of the chart. Simultaneously with the energizing of the blower, the magnetic clutch on the compressor is energized by the electrical contact made between terminals 92 and 94 by spring 88 on the actuator 78, also in accordance with column two of the chart. With the recirculating door 36 open, the bypass door 42 open, the distribution door 50 up, the main door 48 down, the blower 46 on high speed, and the compressor operatively connected to the engine by the magnetic clutch, the condition of "Maximum Cool" is obtained in accordance with column two of said chart. It is noted that the movement of slide 100 to the left causes the ramp 204 on said slide to engage the cam surface 86 of the previously depressed actuator 76 and force said actuator to its "up" position.

The depression of the actuators 80, 82, and 84 cause similar shifting of the slides, valve and contactor as shown in Figures 4, 5, 6, 18, 19, and 20.

In Figures 4 and 18 it is shown that the depression of actuator 80 causes its cam surface 86 to ride on ramp 218 of slide 106, ramp 198 of slide 104, and ramp 184 of slide 102 to move valve 114 to a position encompassing within its recess the orifices 62, 64, 68, and 72 which results in the door positions shown in column three of the chart. The contactor has shifted and electrically connected the low speed contact 154 of the blower 46 to the power source contact 152. The spring 88 on actuator 80 has contacted terminals 92 and 94 of the compressor and has energized said compressor in accordance with the chart. Previously depressed actuator 78 has been returned to its "up" position by ramps 196 and 216 of slides 104 and 106 respectively.

In Figures 5 and 19 it is shown that the depression of actuator 82 causes its cam surface 86 to ride on ramp 188 of slide 102, and ramp 210 of slide 100 which causes valve 114 to move to a position encompassing orifices 62, 66, 68, and 72 and results in the door positions shown in column four of the chart. The actuator 80 has been returned to its "up" position by ramp 208 of slide 100.

In Figures 6 and 20 it is shown that the depression of actuator 84 causes its ramp 86 to ride on ramp 222 of slide 106 and ramp 190 of slide 102 to move valve 114 to a position encompassing orifices 62, 66, 70, and 72 which results in the door positions shown in column five of the chart. Ramp 220 of slide 104 has returned actuator 82 to its "up" position.

The above operating description is merely representative of the manner in which the control device can be operated. It is obvious that the actuators may be depressed in any order desired to produce any one of the five conditions of the air conditioning and heating system listed in chart 21.

As will be readily apparent to those skilled in the art, modifications may be made in our invention without departing from the scope and spirit thereof, and while we have disclosed our invention as being related to an automotive air conditioning and heating system for the purpose of illustration, we do not intend to be limited by such structure except insofar as is specifically set forth in the subjoined claims. Having thus described our invention, what we claim as new and what we desire to protect by United States Letters Patent is:

1. A control device comprising a housing having a valve member movably mounted thereon and provided with a first position and a plurality of other positions to which said valve member may be selectively moved, a slide operatively connected to said valve member and reciprocable within said housing to selectively position said valve member at each of its positions, a plurality of actuators evenly spaced and mounted in said housing for movement at right angles to the axis of reciprocation of said slide and being depressible toward said slide, and a plurality of cam surfaces on said slide, each one of said surfaces being engageable by a different one of said actuators, at least two of said surfaces sloping in the same direction but at different angles with respect to the axis of reciprocation of said actuators to allow said actuators to progressively move said slide in one direction to a plurality of valve positions.

2. A control device comprising a housing having a fluid pressure valve means thereon, a slide operatively connected to said valve means and reciprocable within said housing to selectively position said valve means at each of a plurality of operating stations, said slide having a plurality of unequally spaced ramps of the same inclination thereon, a plurality of equally spaced actuators reciprocably mounted on said housing at right angles to the axis of reciprocation of said slide, and each of said actuators being depressible into engagement with a particular one of said ramps to selectively position said valve means at each of said plurality of stations.

3. A control device comprising a housing having a fluid pressure valve means thereon, a slide operatively connected to said valve means and reciprocable within said housing to selectively position said valve means at each of a plurality of operation stations, said slide having a plurality of equally spaced ramps of the same inclination thereon, a plurality of unequally spaced actuators reciprocably mounted on said housing at right angles to the axis of reciprocation of said slide, and each of said actuators being depressible into engagement with a particular one of said ramps to selectively position said valve means at each of said plurality of stations.

4. A control device comprising a housing having a fluid pressure valve means thereon, a slide operatively connected to said valve means and reciprocable within said housing to selectively position said valve means at each of a plurality of operating stations, said slide having a plurality of ramps thereon the apexes of said ramps being equally spaced and the angles of inclination of said ramps being different, a plurality of equally spaced actuators reciprocably mounted on said housing at right angles to the axis of reciprocation of said slide, and each of said actuators being depressible into engagement with a particular one of said ramps to selectively position said valve means at each of said plurality of stations.

5. A control device for controlling an air conditioning system by selectively applying fluid pressure to components thereof, comprising a housing having a plurality of apertures through a portion thereof, one of said apertures adapted to be connected to a source of fluid pressure and the other of said apertures adapted to be operatively connected to separate fluid conduits, a valve member slidably mounted in said housing and having shoulder means on the bottom thereof forming a recess therein, said shoulder means mating with said portion of said housing and being slidable thereon to a plurality of positions, said recess in said valve member being of sufficient area to encompass selected ones of said apertures at each of said positions to provide an air passage interconnecting said selected apertures, a slide mounted for reciprocation in said housing and being operatively connected to said valve member, a plurality of actuators reciprocably mounted on said housing and carrying actuating surfaces movable into engagement with said slide, and cam ramps on said slide, some of said ramps having uneven spacing and different slopes and being engageable by selected ones of said actuators to progressively move said slide and said connected valve member to a selected one of said plurality of positions with respect to said apertures as each one of said actuators is progressively moved into engagement with said means on said slide.

6. A control device for controlling an air conditioning system by selectively applying fluid pressure to components thereof, comprising a housing having a plurality of apertures through a portion thereof, one of said apertures adapted to be connected to a source of fluid pressure and the other of said apertures adapted to be operably connected to separate fluid conduits, a valve member reciprocably mounted in said housing and having shoulder means on the bottom thereof defining a recess therein, said shoulder means adapted to slide on said portion of said housing to a plurality of positions, said recess in said valve member being of sufficient area to encompass selected ones of said apertures at each one of said plurality of positions to provide an air passage interconnecting said selected apertures, a slide mounted for reciprocation in said housing and being operatively connected to said valve member, a plurality of ramps unevenly spaced on said slide, a plurality of actuators equally spaced and reciprocably mounted on said housing, each of said actuators being movable into camming engagement with individual ones of said ramps to cam said slide a predetermined distance in a predetermined direction whereby said valve member is moved into a particular one of said plurality of positions to encompass within its recess selected ones of said apertures.

7. A control device for controlling an air conditioning system by selectively applying fluid pressure to components thereof, comprising a housing having a plurality of apertures through a portion thereof, one of said apertures adapted to be connected to a source of fluid pressure and the other of said apertures being adapted to be operatively connected to separate fluid conduits, a valve member reciprocably mounted in said housing and having a recess therein, said valve member adapted to slide on said portion of said housing to a plurality of positions, said recess in said valve member being of sufficient area to encompass selected ones of said apertures at each one of said plurality of positions to provide an air passage interconnecting said selected apertures, a slide mounted for reciprocation in said housing and being operatively connected to said valve member, a plurality of ramps on said slide unevenly spaced apart and projecting therefrom at the same angle, a plurality of evenly spaced actuators reciprocably mounted on said housing, each one of said plurality of actuators being movable into camming engagement with individual ones of said ramps for progressively and incrementally moving said slide and said valve member to each one of said plurality of positions.

8. A control device for controlling an air conditioning system by selectively applying fluid pressure to components thereof, comprising a housing having a plurality of apertures through a portion thereof, one of said apertures adapted to be connected to a source of fluid pressure and the other of said apertures being adapted to be operatively connected to said components through separate fluid conduits, a valve member reciprocably mounted in said housing and having a recess therein, said valve member adapted to slide on said portion of said housing to a plurality of positions, said recess in said valve member being of sufficient area to encompass selected ones of said apertures at each one of said plurality of positions to provide an air passage interconnecting said selected apertures, a slide mounted for reciprocation in said housing and being operatively connected to said valve member, a plurality of ramps provided on said slide are unevenly spaced apart and inclined at different angles, a plurality of evenly spaced actuators reciprocably mounted on said housing, each of said actuators having a cam face movable into engagement with individual ones of said ramps for progressively and incrementally moving said slide and said valve member to each one of said plurality of positions.

9. A control device for controlling an air conditioning system by selectively applying fluid pressure to some components and electrical current to other components thereof, said apparatus comprising a housing having a plurality of apertures through a portion thereof, one of said apertures adapted to be connected to a fluid pressure source and the other of said apertures adapted to be operatively connected to separate fluid conduits, a valve member having a recess therein and adapted to slide on said portion of said housing to a plurality of positions, said recess being of sufficient area to encompass selected ones of said apertures including said aperture to be connected to said fluid pressure source, at each of said positions to provide a fluid passage interconnecting said selected apertures, a slide mounted for reciprocation in said housing and being operatively connected to said valve member, a plurality of actuators mounted on said housing and movable into engagement with said slide, means on said slide engageable by said actuators to move said slide and said valve member to a particular one of said plurality of positions with respect to said apertures as each one of said actuators is moved into engagement with said means on said slide, a plurality of electrical terminals on a second portion of said housing adapted to be connected to electrical leads, an electrical contactor adapted to slide on said second portion of said housing to a plurality of stations and being shaped so as to interconnect selected ones of said electrical terminals at each of said stations and provide an electrical path between said selected terminals, a second slide mounted for reciprocation in said housing and being operatively connected to said contactor, means on said second slide engageable by said actuators to move said contactor to a particular one of said plurality of stations with respect to said terminals as each one of said actuators is moved into engagement with said means on said second slide.

10. A control device for controlling an air conditioning system by selectively applying fluid pressure to some components and electrical current to other components thereof, comprising a housing having a plurality of apertures through a first portion thereof, one of said apertures adapted to be permanently connected to a fluid pressure source and the other of said apertures adapted to be operatively connected to separate fluid conduits, a plurality of electrical terminals on a second portion of said housing, one of said terminals adapted to be connected to an electrical power source and the other of said terminals adapted to be connected to separate electrical leads, a first slide reciprocably mounted in said housing, a recessed valve member carried by said first slide, said first slide being selectively movable to each of a plurality of positions with respect to said apertures to position the recess in said valve member over selected ones of said apertures including said aperture adapted to be connected to said fluid pressure source to interconnect said selected ones of said apertures at each of said positions, a second slide reciprocably mounted in said housing, a contactor carried by said second slide, said second slide being selectively movable to each of a plurality of positions with respect to said electrical terminals to interconnect at each one of said plurality of positions selected ones of said terminals including said terminal adapted to be connected to said electrical power source, a plurality of actuators mounted on said housing, each one of said plurality of actuators being selectively movable into engagement with said first and second slide to move said first and second slide to a selected one of each of their plurality of positions.

11. A control device for controlling an air conditioning system by selectively applying fluid pressure to some components and electrical current to other components thereof, comprising a housing having a plurality of apertures through a portion thereof, one of said apertures being adapted for connection to a fluid pressure source and the other of said apertures adapted to be operatively connected to separate fluid conduits, a plurality of electrical terminals on a second portion of said housing and adapted to be connected to separate electrical leads, a first slide reciprocably mounted in said housing, a valve means carried by said first slide, said slide and said valve means carried thereby being selectively movable to each one of a plurality of positions with respect to said apertures to provide a fluid connection between selected ones of said apertures at each one of said plurality of positions, a second slide reciprocably mounted in said housing and carrying a contactor, said slide and contactor carried thereby being selectively movable to each one of a plurality of positions with respect to said electrical terminals to electrically interconnect selected ones of said terminals at each one of said plurality of positions, a plurality of actuators reciprocably mounted on said housing and movable into engagement with said first and second slides, means on said first and second slides engageable by selected ones of said actuators to move said first and second slide means to one of said plurality of positions of each of said slides and into interconnecting engagement with selected ones of said apertures and said terminals respectively.

12. A control device for controlling an air conditioning system by selectively applying fluid pressure to some components and electrical current to other components thereof, comprising a housing having a plurality of apertures through a portion thereof, one of said apertures adapted to be connected to a fluid pressure source and the other of said apertures adapted to be operatively connected to separate fluid conduits of said air conditioning system, a plurality of electrical terminals on a second portion of said housing, one of said terminals adapted for connection to an electrical power source and the other of said terminals adapted for connection to separate electrical leads of said air conditioning system, valve means reciprocably mounted in said housing and selectively movable to each one of a plurality of positions with respect to said plurality of apertures to provide a fluid connection between selected ones of said apertures at each one of said plurality of positions, contact means reciprocably mounted in said housing and selectively movable to each one of a plurality of positions with respect to said plurality of electrical terminals to provide an electrical connection between selected ones of said terminals at each one of said plurality of positions, a plurality of actuators reciprocably mounted on said housing and movable into engagement with said valve and said contact means, a plurality of inclined surfaces on said valve and said contact means, each of said surfaces being engageable by a particular one of said actuators as said particular actuator is selectively reciprocated to move said valve means and said contact means into interconnecting engagement with selected ones of said apertures and said terminals respectively at each one of said plurality of positions of said valve and contact means.

13. A control device for controlling an air conditioning system by selectively applying fluid pressure to some components and electrical current to other components thereof, comprising a housing having a plurality of apertures through a portion thereof and adapted to be operatively connected to separate fluid conduits, a plurality of electrical terminals on a second portion of said housing and adapted to be connected to separate electrical leads, a first slide reciprocably mounted in said housing and selectively movable to each of a plurality of positions with respect to said apertures, a valve member operatively connected to said first slide to move therewith and having a recessed area therein of sufficient size to encompass and interconnect selected ones of said apertures at each of said positions, a second slide reciprocably mounted in said housing and selectively movable to each of a plurality of positions with respect to said electrical terminals, a contactor operatively connected to said second slide to move therewith to interconnect selected ones of said terminals at each of said positions, cam surfaces on said first and second slides, a plurality of actuators mounted on said housing, each of said actuators having a cam surface adapted to ride on a particular one of said cam surfaces of each of said first and second slides and selectively movable into engagement with said cam surfaces of said first and second slides to move said slides to selected ones of each of their plurality of positions.

14. A control device for controlling an air conditioning system by selectively applying fluid pressure to components thereof, comprising a housing having a plurality of apertures through a portion thereof, one of said apertures adapted to be operatively connected to a fluid pressure source and the other of said apertures adapted to be operatively connected to separate fluid conduits, a first slide reciprocably mounted in said housing and having a recessed valve member attached thereto for reciprocable motion therewith, said first slide and said attached valve member being selectively movable to a plurality of stations with respect to said plurality of apertures, said valve member adapted to encompass within its recess at each one of said plurality of stations selected ones of said plurality of apertures including said one aperture adapted to be operatively connected to a fluid pressure source, a plurality of actuators reciprocably mounted on said housing, means on said first slide engageable by said actuators as said actuators are depressed and responsive to force applied thereto by said actuators to move said slide and said attached valve member in said housing to said plurality of stations with respect to said plurality of apertures, a second slide reciprocably mounted in said housing and having means thereon engageable by each one of said plurality of actuators as said actuator is depressed, said second slide being responsive to force applied to said means thereon by each one of said actuators to return each other of said depressed actuators to its undepressed position in said housing.

15. A control device for controlling an air conditioning system by selectively applying fluid pressure to some components and electrical current to other components thereof, comprising a housing having a plurality of apertures through a first portion thereof, one of said apertures adapted to be operatively connected to a fluid pressure source, and the other of said apertures adapted to be operatively connected to separate fluid conduits, a valve member having a recessed area, said valve member being slidably mounted on said first portion of said housing and movable to a plurality of stations, said recessed area being of sufficient size to encompass selected ones of said apertures including said aperture adapted to be operatively connected to a fluid pressure source at each of said stations to provide a fluid passage interconnecting said selected apertures, a first slide mounted for reciprocation in said housing and operatively connected to said valve member to selectively move said valve member to each one of said plurality of stations, a plurality of actuators mounted on said housing and independently movable into engagement with said first slide, first means on said first slide engageable by first selected ones of said actuators and responsive to force applied thereto to incrementally move said first slide and said valve member to said plurality of stations as said first selected ones of said actuators are successively moved into engagement with said first means on said first slide, second means on said first slide engageable by second selected ones of said actuators and responsive to force applied thereto to move said first slide and said connected valve member in an opposite direction to that effected by said first selected ones of said actuators, a plurality of electrical terminals on a second portion of said housing adapted to be connected to electrical leads, an electrical contactor slidably mounted on said second portion of said housing and movable to a plurality of positions with respect to said terminals, said contact member being shaped so as to electrically connect selected ones of said electrical terminals at each of said positions and provide an electrical path between said selected terminals at each said positions, a second slide mounted for reciprocation in said housing and operatively connected to said contactor to selectively move said contactor to each one of said plurality of positions, a first means on said second slide engageable by third selected ones of said actuators to move said contactor in response to force applied thereto to said plurality of positions with respect to said terminals as each one of said actuators is selectively moved into engagement with said first means on said second slide, second means on said second slide engageable by fourth selected ones of said actuators and responsive to force applied thereto to move said second slide and said connected contactor in an opposite direction to that effected by said third selected ones of said actuators.

16. A control device comprising a housing having a fluid pressure valve means thereon, a slide operatively connected to said valve means and reciprocable within said housing to selectively position said valve means at each of a plurality of operating stations, said slide having a plurality of unequally spaced ramps of the same inclination thereon, a plurality of equally spaced actuators reciprocably mounted on said housing with the axis of reciprocation of each thereof making an acute angle with each of said ramps, and each of said actuators being depressible into engagement with a particular one of said ramps to selectively position said valve means at each of said plurality of stations.

17. A control device comprising a housing having a fluid pressure valve means thereon, a slide operatively connected to said valve means and reciprocable within said housing to selectively position said valve means at each of a plurality of operating stations, said slide having a plurality of equally spaced ramps of the same inclination thereon, a plurality of unequally spaced actuators reciprocably mounted on said housing with the axis of reciprocation of each thereof making an acute angle with each of said ramps, and each of said actuators being depressible into engagement with a particular one of said ramps to selectively position said valve means at each of said plurality of stations.

18. A control device comprising a housing having a fluid pressure valve means thereon, a slide operatively connected to said valve means and reciprocable within said housing to selectively position said valve means at each of a plurality of operating stations, said slide having a plurality of ramps thereon the apexes of said ramps being equally spaced and the angles of inclination of said ramps being different, a plurality of equally spaced actuators reciprocably mounted on said housing with the axis of reciprocation of each thereof making an acute angle with each of said ramps, and each of said actuators being depressible into engagement with a particular one of said ramps to selectively position said valve means at each of said plurality of stations.

References Cited in the file of this patent
UNITED STATES PATENTS

| 2,296,563 | Moller | Sept. 22, 1942 |
| 2,723,317 | Hutt | Nov. 8, 1955 |
| 2,878,329 | Vermeulen | Mar. 17, 1959 |